US011936463B2

United States Patent
Baker et al.

(10) Patent No.: US 11,936,463 B2
(45) Date of Patent: Mar. 19, 2024

(54) MANAGING SATELLITE BEARER RESOURCES

(71) Applicant: Airbus Defence and Space Limited, Stevenage (GB)

(72) Inventors: Ashley Baker, Stevenage (GB); Paul Adams, Stevenage (GB); Sam Wooler, Stevenage (GB); Brian Van Luipen, Stevenage (GB); Stuart Taylor, Stevenage (GB)

(73) Assignee: Airbus Defence and Space Limited, Stevenage (GB)

( * ) Notice: Subject to any disclaimer, the term of this patent is extended or adjusted under 35 U.S.C. 154(b) by 249 days.

(21) Appl. No.: 17/437,481

(22) PCT Filed: Mar. 12, 2020

(86) PCT No.: PCT/GB2020/050617
§ 371 (c)(1),
(2) Date: Sep. 9, 2021

(87) PCT Pub. No.: WO2020/183182
PCT Pub. Date: Sep. 17, 2020

(65) Prior Publication Data
US 2022/0158719 A1 May 19, 2022

(30) Foreign Application Priority Data

Mar. 13, 2019 (GB) ..................................... 1903437

(51) Int. Cl.
*H04B 7/185* (2006.01)
*H04L 41/16* (2022.01)

(52) U.S. Cl.
CPC ..... *H04B 7/18513* (2013.01); *H04B 7/18558* (2013.01); *H04L 41/16* (2013.01)

(58) Field of Classification Search
CPC .. H04B 7/18531; H04B 7/18558; H04L 41/16
See application file for complete search history.

(56) References Cited

U.S. PATENT DOCUMENTS

| 7,450,914 B2 * | 11/2008 | Valdivia | ............ | H04B 7/18586 455/446 |
| 9,736,844 B2 * | 8/2017 | Tayrac | ............... | H04B 7/18539 |

(Continued)

FOREIGN PATENT DOCUMENTS

| CN | 108966352 A | 12/2018 |
| WO | 2010054394 A2 | 5/2010 |
| WO | 2010148022 A | 12/2010 |

OTHER PUBLICATIONS

Examination Report from corresonding GB application No. GB1903437.0, dated Oct. 31, 2022.

(Continued)

*Primary Examiner* — Hai V Nguyen
(74) *Attorney, Agent, or Firm* — Greer, Burns & Crain, Ltd.

(57) ABSTRACT

Measures for managing satellite bearer resources of a satellite telecommunications network. A corpus of data based on historical satellite bearer resource allocations is maintained. A machine learning agent is trained with the corpus to determine a plurality of weights for use in directing satellite bearer resource management in the satellite telecommunications network. A satellite bearer resource allocation request is received. A set of features is extracted from a current environment of the satellite telecommunications network. The set of features defines currently allocated satellite bearer resources. On the basis of the determined plurality of weights and the set of features, satellite bearer resources of the satellite telecommunications network are managed to satisfy the request.

19 Claims, 8 Drawing Sheets

(56) References Cited

U.S. PATENT DOCUMENTS

| | | | |
|---|---|---|---|
| 10,020,875 B2 | 7/2018 | Agarwal | |
| 10,797,787 B2* | 10/2020 | Irani | H04B 7/18521 |
| 11,052,002 B2* | 7/2021 | Garland | A61G 5/061 |
| 11,689,944 B2* | 6/2023 | Vasudevan | H04W 28/24 |
| | | | 370/252 |
| 2003/0027522 A1* | 2/2003 | Valdivia | H04B 7/18586 |
| | | | 455/12.1 |
| 2010/0118769 A1 | 5/2010 | Agarwal | |
| 2013/0016649 A1* | 1/2013 | Damnjanovic | H04W 88/04 |
| | | | 370/315 |
| 2013/0021932 A1* | 1/2013 | Damnjanovic | H04W 52/0209 |
| | | | 370/252 |
| 2016/0088627 A1* | 3/2016 | Tayrac | H04B 7/18539 |
| | | | 370/319 |
| 2016/0275873 A1* | 9/2016 | Taylor | G06F 3/147 |
| 2019/0174449 A1* | 6/2019 | Shan | H04W 60/04 |
| 2022/0190886 A1* | 6/2022 | Islam | H04W 72/1268 |
| 2022/0272084 A1* | 8/2022 | Hyatt | H04W 12/40 |
| 2023/0018958 A1* | 1/2023 | Gan | H04W 76/30 |

OTHER PUBLICATIONS

Camarda, P. et al., A Dynamic Bandwidth Resource Allocation based on Neural Networks in EuroSkyWay Multimedia Satellite System, International Journal of Communication Systems, Jan. 2002. (Abstract Only).
International Search Report; priority document.
P. Camarda et al., "A Dynamic Bandwidth Resource Allocation Based on Neural Networks in Euroskyway Multimedia Satellite System" International Journal of Communication Systems, Jan. 1, 2002, pp. 1-25.
Paulo Victor R. Ferreira et al., "Multi-Objective Reinforcement Learning-Based Deep Neural Networks for Cognitive Space Communications" 2017 Cognitive Communications for Aerospace Applications Workshop, IEEE, Jun. 27, 2017.
United Kingdom Search Report; priority document.

* cited by examiner

Queue

Bearer

Queue

Bearer

MANAGING SATELLITE BEARER RESOURCES

CROSS-REFERENCES TO RELATED APPLICATIONS

This is a national phase application of PCT Application No. PCT/GB2020/050617 filed 12 Mar. 2020 which claims the benefit of the British Patent Application No. 1903437.0 filed on 13 Mar. 2019, the entire disclosures of both of which are incorporated herein by way of reference.

FIELD OF THE INVENTION

The present disclosure concerns the management of bearer resources. In particular, but not exclusively, the present disclosure concerns management of satellite bearer resources of a satellite telecommunications network.

BACKGROUND OF THE INVENTION

A satellite telecommunications network may comprise one or more communication satellites and at least two terminals, the network enabling communication between the terminals via the one or more communication satellites. A communication satellite in such a network comprises one or more transponders that have finite resources such as bandwidth and power. The transponder provides a bearer that may carry one or more communication channels. In the case of a communication satellite, the bearer is typically a radio link and a channel is a subdivision of that radio link. The term 'bearer' can be considered to also include the satellite and/or transponder(s).

Such a communication channel on a bearer uses an allocated portion of the resources of the bearer, the resources comprising the transponder power and bandwidth. The size and shape of the allocated portion of resources depends on the specific requirements of the communication channel. The requirements of a channel are determined by the specific characteristics of an overall communication link of which the communication channel is part. For example, a communication link may require a certain geographical coverage and a minimum data transmission rate. To meet these exemplary requirements, the communication channel must be allocated sufficient power and bandwidth to ensure reliable data transmission at the specified rate across the specified geographical area. However, the resources of a given bearer are finite, and therefore the resources that may be allocated cannot exceed certain constraints, in particular, the maximum power level and the maximum bandwidth of the transponder.

In known systems, a human operator (a satellite resource 'planner') manages the satellite bearer resources to fulfill the requirements of requested communication channels. The planner allocates bearer resources to create a communication channel to satisfy a request. However, the freedom to assign such resources is constrained by factors such as the available transponder power, the available transponder bandwidth, the noise floor, transponder fragmentation issues, the gain at the terminal, and the type of modulation and coding chosen. These factors may vary with time; particularly the available transponder power and bandwidth, as previously allocated communication channels expire and new communication channels are allocated to the bearer. The task of allocating satellite bearer resources to satisfy requests therefore involves a complex interplay between a wide range of factors, and necessitates an understanding of the communications request and the characteristics and constraints of the bearer.

Due to this complexity, a human planner managing the resource allocation of a communication satellite bearer is able to achieve only low levels of efficiency. Consequently, large portions of the bearer resources are not utilized over the lifetime of the satellite. Furthermore, the complexity of planning is expected to increase in future, due to the introduction of digital payloads with cross-banding capabilities and the use of bearers of opportunity. It is also expected that the volume and frequency of orders and the variation in those orders will increase in future, giving rise to a need for faster and more dynamic management of bearer resources.

The present disclosure seeks to mitigate the above-mentioned problems. Alternatively or additionally, the present disclosure seeks to provide improved management of satellite bearer resources of a satellite telecommunications network.

SUMMARY OF THE INVENTION

According to a first aspect of the present disclosure, there is provided a method of managing satellite bearer resources of a satellite telecommunications network, the method comprising:
  maintaining a corpus of data based on historical satellite bearer resource allocations;
  training a machine learning agent with the corpus to determine a plurality of weights for use in directing satellite bearer resource management in the satellite telecommunications network;
  receiving a satellite bearer resource allocation request;
  extracting a set of features from a current environment of the satellite telecommunications network, the set of features defining currently allocated satellite bearer resources; and
  on the basis of the determined plurality of weights and the set of features, managing satellite bearer resources of the satellite telecommunications network to satisfy the request.

According to a second aspect of the present disclosure there is provided a system for managing satellite bearer resources of a satellite telecommunications network, the system being configured to:
  maintain a corpus of data based on historical satellite bearer resource allocations;
  train a machine learning agent with the corpus to determine a plurality of weights for use in directing satellite bearer resource management in the satellite telecommunications network;
  receive a satellite bearer resource allocation request;
  extract a set of features from a current environment of the satellite telecommunications network, the set of features defining currently allocated satellite bearer resources; and
  on the basis of the determined plurality of weights and the set of features, manage satellite bearer resources of the satellite telecommunications network to satisfy the request.

According to a third aspect of the present disclosure there is provided a computer program comprising a set of instructions, which, when executed by a computerized device, cause the computerized device to perform a method of managing satellite bearer resources of a satellite telecommunications network, the method comprising:

maintaining a corpus of data based on historical satellite bearer resource allocations;

training a machine learning agent with the corpus to determine a plurality of weights for use in directing satellite bearer resource management in the satellite telecommunications network;

receiving a satellite bearer resource allocation request;

extracting a set of features from a current environment of the satellite telecommunications network, the set of features defining currently allocated satellite bearer resources; and on the basis of the determined plurality of weights and the set of features, managing satellite bearer resources of the satellite telecommunications network to satisfy the request.

It will of course be appreciated that features described in relation to one aspect of the present disclosure may be incorporated into other aspects of the present disclosure. For example, the method of the disclosure may incorporate any of the features described with reference to the apparatus of the disclosure and vice versa.

BRIEF DESCRIPTION OF THE DRAWINGS

Embodiments of the present disclosure will now be described by way of example only with reference to the accompanying drawings of which.

DETAILED DESCRIPTION OF THE PREFERRED EMBODIMENTS

Figure 1:
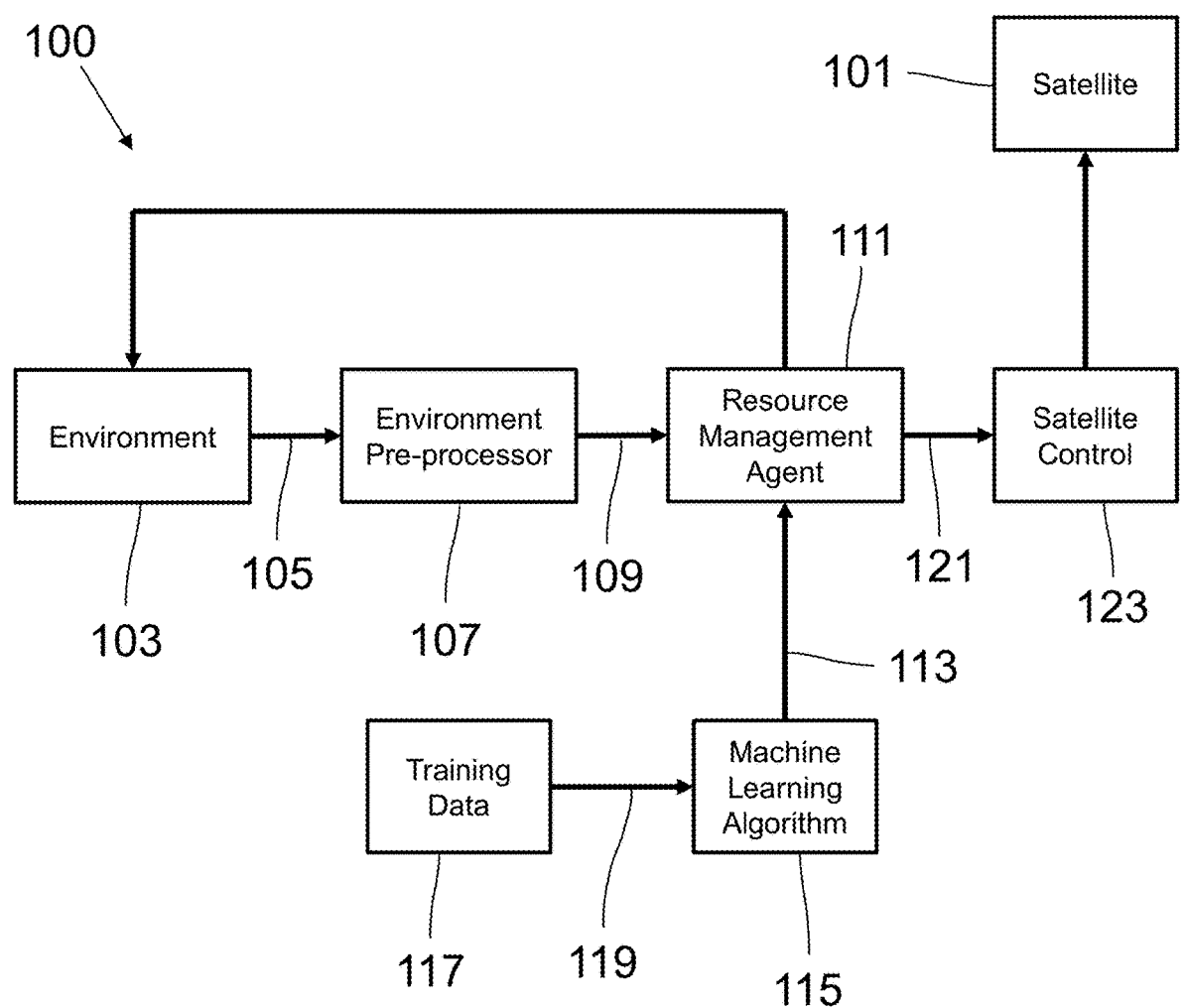
FIG. 1 shows a block diagram of a system according to embodiments of the present disclosure.

FIG. 1 shows a block diagram of a system 100 for managing satellite bearer resources of a satellite telecommunications network according to embodiments of the present disclosure.

The satellite telecommunications network depicted in FIG. 1 comprises a satellite 101 (in other embodiments, the satellite telecommunications network comprises a plurality of communication satellites). Satellite 101 comprises a transponder that provides a bearer. In embodiments, satellite 101 comprises a plurality of transponders which together provide the bearer. The bearer comprises a radio link that may carry one or more communication channels. A communication channel comprises a subdivision of the radio link such that a communication channel on the bearer uses an allocated portion of resources of the bearer. The bearer resources comprise the bearer power and bandwidth and are finite, being constrained by the maximum output power level and the maximum bandwidth of the transponder.

An environment 103 comprises data defining the characteristics of the bearer in its current state. At a given point in time, the bearer may carry one or more communication channels, each of which will occupy a portion of the bearer resources. The bearer characteristics comprise the total resources of the bearer, as determined by the maximum output power and maximum bandwidth of the transponder; the already allocated bearer resources, including the communication channels to which those resources have been allocated; and a time to expiry of each of the communication channels. A communication channel may have a limited lifetime on the bearer, after which it expires and the resources allocated to that communication channel become free for reallocation. Communication channels may also be added to the bearer as and when new communication requirements arise. Therefore, the communication channels on the bearer will change over time as new communication channels are added to the bearer and pre-existing communication channels expire or are removed.

In embodiments, the bearer characteristics comprise a measure of a priority of the communication channels. The priority of a communication channel may indicate the importance of the communication channel and the severity of the consequences of any interruption to or disturbance of the communication channel. In embodiments, a communication channel may have either a relatively low priority or a relatively high priority. Embodiments may further comprise a medium priority, which is between the relatively low priority and the relatively high priority. Embodiments can employ any number of priority levels.

In embodiments, the bearer characteristics comprise an indication of a currently selected communication channel. In embodiments, actions to manage the bearer can only be taken on a selected channel. In embodiments, only one communication channel may be selected at any given time. The currently selected communication channel may be referred to as the working channel.

In embodiments, the bearer characteristics comprise constraints, for example due to one or more of forbidden frequency bands; intermodulation effects; modulation and coding; and telemetry, tracking and command functions.

Environment 103 may also comprise a received satellite bearer resource allocation request. In embodiments, the satellite bearer resource allocation request comprises a request to implement a given telecommunications service using satellite bearer resources of the satellite telecommunications network. In embodiments, such a request comprises a request for allocation of a specified frequency band and a specified transmit power. Thus, the particular size and shape of the allocated portion of resources may be (at least in part) dictated by the request. In embodiments, such requests comprise higher-level functional requirements of an overall communication link of which the requested communication channel is to form part. For example, the communication link may require a certain geographical coverage and a minimum data transmission rate. To meet these exemplary requirements, the communication channel must be allocated sufficient power and bandwidth to ensure reliable data transmission at the specified rate across the specified geographical area. Thus, the particular size and shape of the portion of resources allocated to create a communication channel to satisfy the request may be selected by resource management agent 111.

Figure 2:
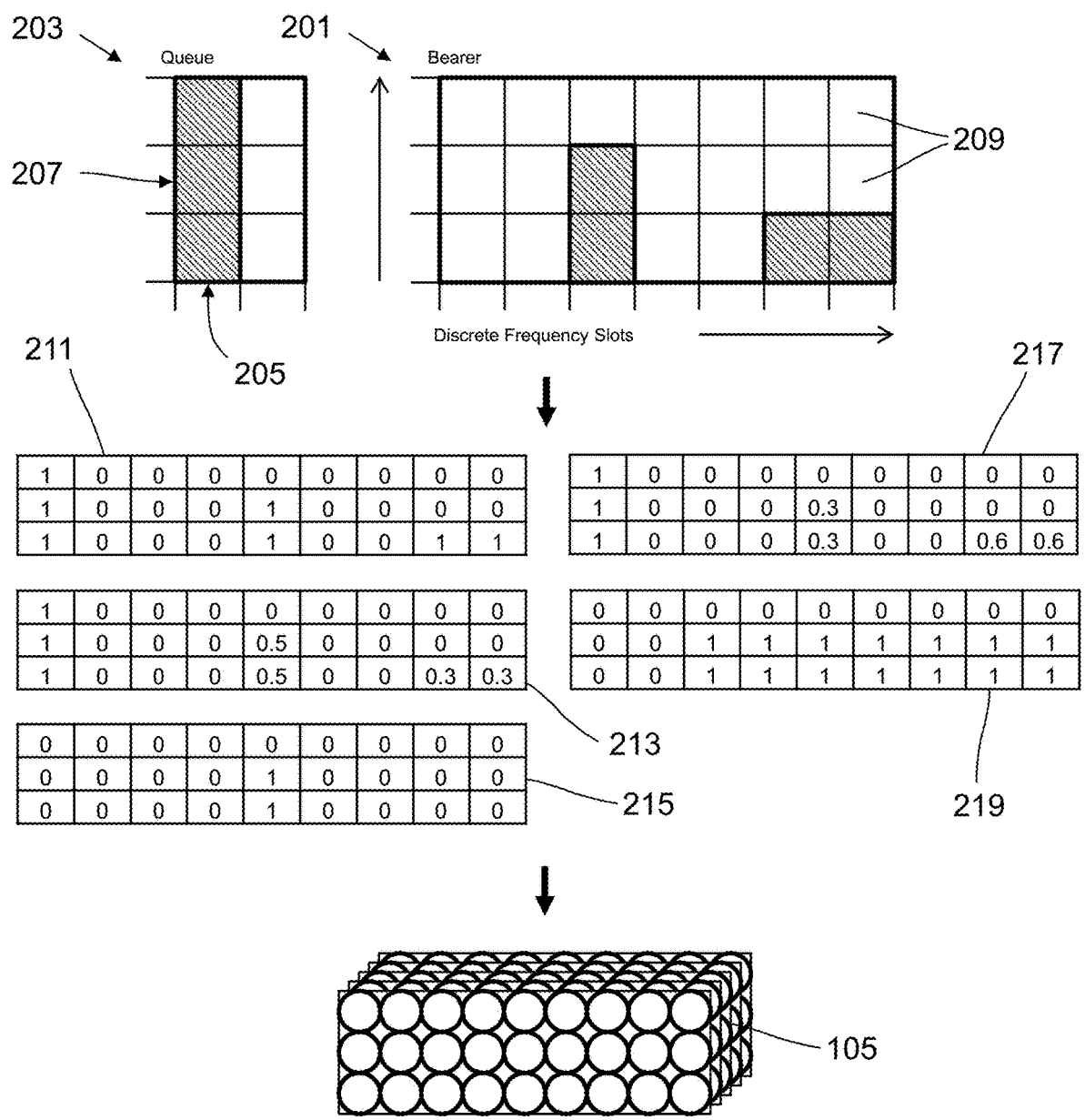
FIG. 2 shows a representation of an environment according to embodiments of the present disclosure.

FIG. 2 shows such a representation of an exemplary environment. The resources of the bearer 201 (and the resource requirements by a resource allocation request 203) can be viewed as being divided into a plurality of discrete frequency slots 205 and a plurality of discrete power units 207. Each frequency slot 205 comprises a portion of the bandwidth of the bearer and each power unit 207 comprises a portion of the total bearer power, such that summing the frequency slots provides the total utilized frequency spectrum and summing the power units provides a total allocated power. In embodiments, the frequency slots are all of the same bandwidth. In embodiments, the power units each represent an equally sized unit of power. The array comprises a plurality of cells 209, each of which correspond to a single frequency slot 205 and a single power unit 207.

Environment 103 can therefore be defined by a series of two-dimensional arrays, where a first of the two dimensions indicates frequency slots 205 and a second of the two dimensions indicates power units 207 allocated to the corresponding frequency slot. The width of the array corresponds to the number of frequency slots 205, and is therefore determined by the width of the frequency slots 205 and the maximum bandwidth of the bearer. The height of the array corresponds to the number of power units 207, and so is determined by the size of power unit 207 and the maximum total power of the bearer. Each array of the series may be referred to as a layer.

An exemplary first layer, the spatial layer 211, indicates which cells of the grid have been allocated to communication channels. The spatial layer therefore indicates what bearer resources have been allocated. All allocated cells have a value of '1'. The remaining unallocated cells have a value of '0'.

An exemplary second layer, the temporal layer 213, indicates the remaining time until allocated communication channels expire. The values of the cells of temporal layer 213 are normalized, such that the longest expiry time of the communication channels corresponds to a value of '1' and a shorter expiry time has a proportionally reduced value. Cells to which no communication channels have been allocated have a value of '0'.

An exemplary third layer, the selection layer 215, indicates the working channel. Those cells corresponding to the working channel have a value of '1'. All other cells have a value of '0'.

An exemplary fourth layer, the priority layer 217, indicates the priority of communication channels. The values of the cells of the priority layer are normalized, such that a cell corresponding to a communication channel with the highest priority has a value of '1' and cells corresponding to communication channels with lower priorities have a value of between '0' and '1'. For example, in embodiments with three priorities (low, medium, and high), cells corresponding to a low priority communication channel will have a value of '0.3', cells corresponding to a medium priority communication channel will have a value of '0.6', and cells corresponding to a high priority communication channel will have a value of '1'. Cells to which no communication channels have been allocated have a value of '0'.

An exemplary fifth layer, the power layer 219, indicates the percentage usage of the total bearer power. The number of rows of the layer that have the value '1' indicates the percentage usage. At 100% usage all cells in the layer have a value of '1' and at 0% usage all cells have a value of '0'.

Embodiments may comprise additional layers to those listed above. For example, embodiments may comprise a forbidden band layer that indicates use-restricted portions of the frequency spectrum. Embodiments of the invention may define the environment by use of a different set of layers to that listed above.

The layers, appended together to form a three-dimensional matrix 105, define environment 103.

Referring back to FIG. 1, an environment pre-processor 107 is configured to process matrix 105 to extract a set of features 109, which characterize environment 103. Set of features 109 characterizes the currently allocated satellite bearer resources and any current resource allocation requests.

In embodiments, set of features 109 comprises one or more of the currently available transponder power, the currently available frequency spectrum, a priority of a communication channel, a remaining lifetime or wait time of a communication channel, and an indication of whether a communication channel is currently the working channel.

Environment pre-processor 107 converts environment state data into a format compatible with a resource management agent 111. In embodiments, environment pre-processor 107 comprises conventional image processing capabilities.

Feature set 109 is passed to resource management agent 111. Resource management agent 111 is configured to manage the bearer resources to satisfy a received satellite bearer resource allocation request.

In embodiments, managing the bearer resources comprises allocating satellite bearer resources to satisfy the satellite bearer resource allocation request. Allocating satellite bearer resources to create a communication channel to satisfy a request may be referred to as allocating or adding the request to the bearer.

In embodiments, the managing comprises modifying one or more other currently allocated satellite bearer resources. In some circumstances, it may be that the bearer lacks the available resources to fulfill a request without modifying one or more communication channels that are already allocated to the bearer. Modifying existing allocations may comprise removing one or more communication channels from the bearer, or moving one or more communication channels within the bearer. Removing a communication channel from the bearer may comprise deallocating resources that have previously been allocated to the communication channel, such that the communication channel is no longer on the bearer. Moving a communication channel may comprise deallocating resources previously allocated to the communication channel and allocating to the communication channel new bearer resources corresponding to a different frequency band, such that the communication channel can be viewed as having been moved to another part of the frequency spectrum of the bearer.

In embodiments, the managing comprises performing at least one discrete action on one or more communication channels. The at least one discrete action may comprise one or more of selecting a communication channel to be the working channel, adding a communication channel to the bearer, moving the working channel, removing the working channel, and re-shaping a communication channel. Re-shaping a communication channel may comprise altering the power and/or bandwidth requirements of a communication channel. A communication channel may be re-shaped if the bearer has insufficient unallocated resources to add a requested communication channel to the bearer. For example, in the event that a bearer has insufficient unallocated power to implement a communication channel, the communication channel may be re-shaped such that it is allocated less power than that specified in the resource allocation request for that communication channel. It may be that the communication channel is allocated a greater bandwidth than requested to compensate for the reduced power allocation. In this context, the term "communication channel" should also be taken to include requests.

In embodiments, the managing is performed on the basis of a further received satellite bearer resource allocation request. There may be a queue of requests awaiting allocation, and the managing may be performed with reference to the characteristics of requests which are later in the queue than the request currently being allocated.

In embodiments, resource management agent 111 allocates requests in the order in which the requests were added to the queue, such that resource management agent 111 allocates whichever request is at the head of the queue. The communication channel at the head of the queue may be referred to as being a "waiting channel".

In embodiments, the managing is performed based on a first request and a second request that is sequentially after the first request in the queue, such that the second request is taken into account when managing the first request. The second request may be taken into account by, for example, allocating the first request in such a way that leaves sufficient resources free to allocate the second request.

In embodiments, resource management agent 111 may reorder the queue based on characteristics of requests in the queue, for example based on a priority of requests in the queue. Resource management agent 111 may, for example, move relatively high priority requests to the front of the queue such that they are allocated before any relatively low priority requests in the queue In embodiments, resource management agent 111 comprises a neural network. The neural network comprises a series of neural network layers, each layer comprising a plurality of artificial neurons. The artificial neurons are connected by nets, each net having a weight and each weight having a value. In embodiments, the neural network layers are fully connected, such that each artificial neuron is connected to all of the artificial neurons of the adjacent neural network layers. In embodiments, the neural network comprises at least three layers. In embodiments, the neural network comprises five or more layers. In embodiments, the machine learning agent comprises a convolutional neural network and extracting the set of features is performed by the convolutional neural network. The output layer of the neural network comprises an artificial neuron for each of the potential actions available to resource management agent 111. The action decided by resource management agent 111 is that which corresponds to the output artificial neuron with the highest value.

The values of a plurality of weights 113 determine the outputs of the neural network for a given input. Resource management agent 111 is therefore configured to manage the bearer resources on the basis of the plurality of weights 113 and set of features 109. The neural network can be trained to perform a task by adjusting the values of the plurality of weights 113.

In embodiments, the values of the plurality of weights 113 are determined by a machine learning algorithm 115. Machine learning algorithm 115 is configured to operate machine learning techniques to determine values for the plurality of weights 113 that are appropriate for directing satellite bearer resource management. Machine learning algorithm 115 can therefore be said to train resource management agent 111 to direct satellite bearer resource management in a satellite telecommunications network.

In embodiments, machine learning algorithm 115 comprises a reinforcement learning algorithm. In such embodiments, machine learning algorithm 115 operates to determine values for the plurality of weights 113 such that the neural network of resource management agent 111 approximates a decision function that maximizes a reward value. The process of determining values for the plurality of weights 113 that maximizes the reward value may be referred to as training. The output of the training process is a set of values for the plurality of weights 113 for use in directing satellite bearer resource management in the satellite telecommunications network. That set of values may be referred to as a solution.

In embodiments, the training comprises initializing machine learning agent 115 with an initial plurality of weights. Machine learning algorithms operate iteratively, so have a starting point from which to iterate towards a solution.

In embodiments, the training comprises extracting a set of features from an entry from a corpus of training data 117. Training data 117 comprises a corpus of data based on historical satellite bearer resource allocations. The corpus comprises a plurality of entries, each of which correspond to a past environment of a satellite telecommunications network. The entry from the corpus therefore defines a historical environment of the satellite telecommunications network, and the extracted set of features define the historically allocated satellite bearer resources and a satellite bearer resource allocation request.

In embodiments, the training process therefore comprises presenting environment pre-processor 107 with data representing a historical environment of a satellite telecommunications network.

In embodiments, it may be that one or more of the entries in the corpus of training data 117 does not comprise data based on historical satellite bearer resource allocations. It may be that entries in the corpus of training data 117 comprise data based on fictitious or simulated satellite bearer resource allocations.

In embodiments, a deployed resource management agent 111 records received allocation requests and the current environment at the time of receiving the requests for use as entries in training data 117. Embodiments can thereby perform ongoing training of a resource management agent throughout the deployment of a trained resource management agent. Ongoing training can enable resource management agent 111 to behave flexibly, adapting to trends as they vary over time.

The particular entries comprising the corpus of training data 117 influence the particular solutions to which machine learning algorithm 115 is likely to converge. A corpus containing only a narrow range of experiences will, when used as training data, be likely to result in an agent adopting a solution which is highly fitted to that particular range of experiences. Such an agent may be highly suited to situations corresponding to the range of experiences, but less well suited to situations which differ from the range of experiences. By contrast, a corpus containing a broad range of experiences will, when used as training data, be likely to result in an agent adopting a solution that, while not specialized to any one particular situation, may be suited to a correspondingly wide range of situations.

In embodiments, the entries in the corpus of training data 117 all relate to a single satellite telecommunications network. In such embodiments, the training process is predisposed to train resource management agent 111 such that it adopts a solution that is specialized to a specific satellite telecommunications network. In alternative embodiments, the entries in the corpus of training data 117 relate to multiple different satellite telecommunications networks. In such alternative embodiments, the training process is predisposed to train resource management agent 111 such that it adopts a solution that is generally applicable to a variety of satellite telecommunications networks. Embodiments are therefore applicable to satellite telecommunications networks in general, and are not limited to any specific network topology. Similarly, embodiments may be trained to manage multiple satellites in a satellite telecommunications network.

Environment pre-processor 107 and resource management agent 111 process the presented environment, generating neural network outputs corresponding to each of the possible actions for resource management agent 111.

Machine learning algorithm 115 observes these outputs to evaluate the performance of the current values of plurality of weights 113 in directing satellite bearer resource management in the satellite telecommunications network.

In embodiments, the training further comprises calculating a reward metric, on the basis of a predetermined reward structure, by summing reward values associated with one or more events which occur in directing satellite bearer resource management in the satellite telecommunications network; and on the basis of the reward metric, updating the plurality of weights.

In embodiments, the reward structure comprises a communication channel add event with an associated communication channel add reward value. The communication channel add event corresponds to adding one or more new communication channels to the bearer. The communication channel add reward value comprises a relatively small positive value in order to incentivize adding communication channels to the bearer to satisfy requests.

In embodiments, the reward structure comprises a communication channel delete event with an associated communication channel delete reward value. The communication channel delete event corresponds to removing one or more existing communication channels from the bearer. The communication channel delete reward value comprises a relatively large negative value in order to dis-incentivize the deletion of communication channels from the bearer before their expiry.

In embodiments, the reward structure comprises a communication channel move event with an associated communication channel move reward value. The communication channel move event corresponds to moving one or more existing communication channels to a different frequency band on the bearer. The communication channel move reward value comprises a relatively low negative value in order to dis-incentivize moving communication channels once they have been allocated to the bearer, but to encourage moving a communication channel in preference to deleting it from the bearer entirely.

In embodiments, the reward structure comprises a communication channel expiry event with an associated communication channel expiry reward value, the communication channel expiry event comprising the expiry of one or more existing communication channels after a predetermined expiry time. The communication channel expiry reward value comprises a relatively large positive value in order to incentivize allowing communication channels to remain on the bearer for their full lifetime. In embodiments, the predetermined expiry time is comprised in the received satellite bearer resource allocation request. In embodiments, the predetermined expiry time comprises a default expiry time.

In embodiments, the predetermined reward structure comprises a relatively low reward value associated with a relatively low priority communication channel and a relatively high reward value associated with a relatively high priority communication channel. The predetermined reward structure may further comprise a medium reward value associated with a medium priority communication channel, the medium reward value having a reward value between the relatively low reward value and the relatively high reward value.

Embodiments of the present disclosure may comprise an example reward structure as shown in the table below:

TABLE 1

| Priority Event | Low | Medium | High |
|---|---|---|---|
| Communication Channel Added | 1 | 2 | 3 |
| Communication Channel Moved Left/Right | −1 | −5 | −20 |
| Communication Channel Deleted | −10 | −25 | −50 |
| Communication Channel Expired | 50 | 100 | 200 |

In embodiments, the training comprises iterating a multiplicity of times on subsets of the corpus data until either a convergence criteria is satisfied or a maximum number of iterations is reached. Completion of the iteration constitutes the end of the training process, and the plurality of weights so determined constitute a solution.

The evaluation of the performance of plurality of weights 113 measures the appropriateness of the current values of plurality of weights 113 for use in directing satellite bearer resource management in the satellite telecommunications network. This evaluation is used by machine learning algorithm 115 to inform a generation of one or more candidate sets of values for plurality of weights 113. Subsequent iterations of the training operate on one or more of the candidate sets of values for pluralities of weights until arriving at a solution.

In embodiments, the one or more candidate sets of values may be generated on the basis of one of a plurality of previous sets of values, for example the one having resulted in the highest reward metric of the plurality. Embodiments generating candidate sets of values for plurality of weights 113 in such a way can result in the iterating more reliably converging to a solution.

In embodiments, the machine learning agent may comprise a Deep Q-Network (DQN). The machine learning agent may comprise one or more of a DQN, a Double DQN (DDQN), a Dueling DQN, a Dueling DDQN, a Proximal Policy Optimization (PPO) agent, and an Advantage Actor Critic (A2C) agent.

Machine learning and reinforcement learning techniques are well known by those skilled in the art so will not be discussed further here.

On the basis of plurality of weights 113 and set of features 109, resource management agent 111 is configured to generate a command 121 (or set of commands). Command 121 comprises one or more actions that have been determined by resource management agent 111 to manage the bearer resources to satisfy the satellite bearer resource allocation request. Command 121 therefore describes steps to achieve an updated configuration of the bearer.

A satellite control module 123 receives command 121 and transmits it to satellite 101 of the satellite telecommunications network. Satellite 101 reconfigures the transponder, in response to receipt of command 121, to implement the updated configuration of the bearer.

In embodiments, command 121 is generated and sent to satellite 101, via satellite control module 123, without any need for human intervention. Thus, system 100 may be fully automated, such that a request may be received, allocated, and the bearer configuration updated without human intervention. Embodiments can thereby enable rapid and dynamic satellite bearer resource management.

In alternative embodiments, system 100 does not directly generate commands for satellite control module 123, but instead generates suggested actions for a human planner. Thus, system 100 acts as an aid to a human planner in a conventional human-driven system of satellite bearer resource management. The use of such an aid can improve the efficiency of the human planner in managing satellite bearer resources.

In embodiments, satellite control module 123 transmits a command to satellite 101 after allocation of each request received. In alternative embodiments, satellite control module 123 transmits commands to satellite 101 periodically, for example satellite control module 123 may transmit commands to satellite 101 in batches.

Figure 3:
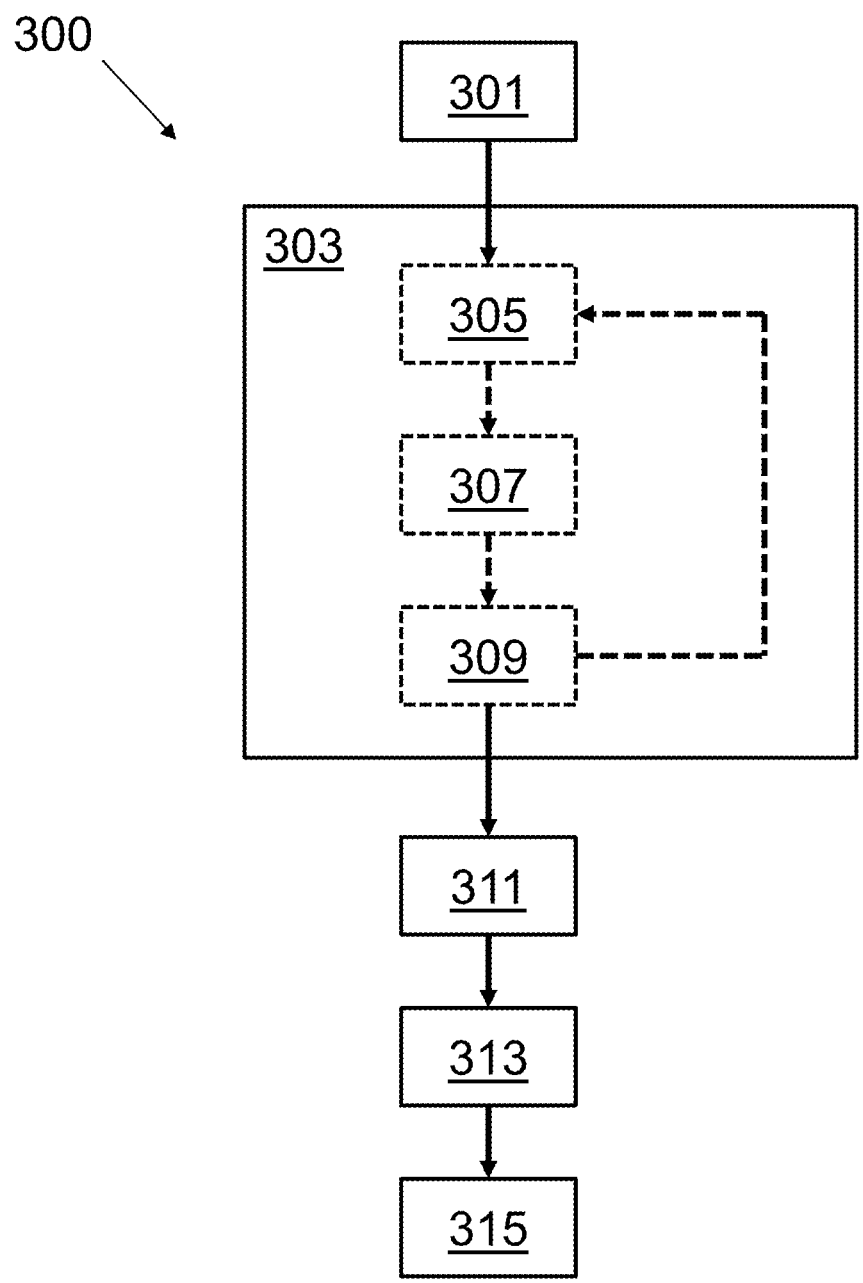
FIG. 3 shows a flow chart illustrating a method according to embodiments of the present disclosure.

FIG. 3 shows a flow chart illustrating a method 300 of managing satellite bearer resources of a satellite telecommunications network according to embodiments of the present disclosure.

A first step, represented by item 301, of method 300 comprises maintaining a corpus of data based on historical satellite bearer resource allocations.

A second step, represented by item 303, of method 300 comprises training a machine learning agent with the corpus to determine a plurality of weights for use in directing satellite bearer resource management in the satellite telecommunications network.

In embodiments, the training may comprise an optional step, represented by item 305, of initializing the machine learning agent with an initial plurality of weights, the weights being for use in directing satellite bearer resource management in the satellite telecommunications network.

In embodiments, the training may comprise an optional step, represented by item 307, of extracting a set of features from data from the corpus, the data defining a historical environment of the satellite telecommunications network the data, and the set of features defining historical allocated satellite bearer resources.

In embodiments, the training may comprise an optional step, represented by item 309, of calculating a reward metric, on the basis of a predetermined reward structure, by summing values associated with one or more events which occur in directing satellite bearer resource management in the satellite telecommunications network and, on the basis of the reward metric, updating the plurality of weights.

In embodiments, the training comprises iterating a multiplicity of times on subsets of the corpus data until either a convergence criterion is satisfied or a maximum number of iterations is reached.

A third step, represented by item 311, of method 300 comprises receiving a satellite bearer resource allocation request.

A fourth step, represented by item 313, of method 300 comprises extracting a set of features from a current environment of the satellite telecommunications network, the set of features defining currently allocated satellite bearer resources.

A fifth step, represented by item 315, of method 300 comprises, on the basis of the determined plurality of weights and the set of features, managing satellite bearer resources of the satellite telecommunications network to satisfy the request.

FIGS. 4a to 4e show simplified representations of five time-steps (or 'snapshots') of a satellite bearer managed according to embodiments of the present disclosure. Communication channels and requests can be represented by three-dimensional blocks, wherein the height of the block corresponds to a power requirement of the communication channel, the width of the block corresponds to a bandwidth requirement of the communication channel, and the depth of the block corresponds to the time until the communication channel expires.

Figure 4A:
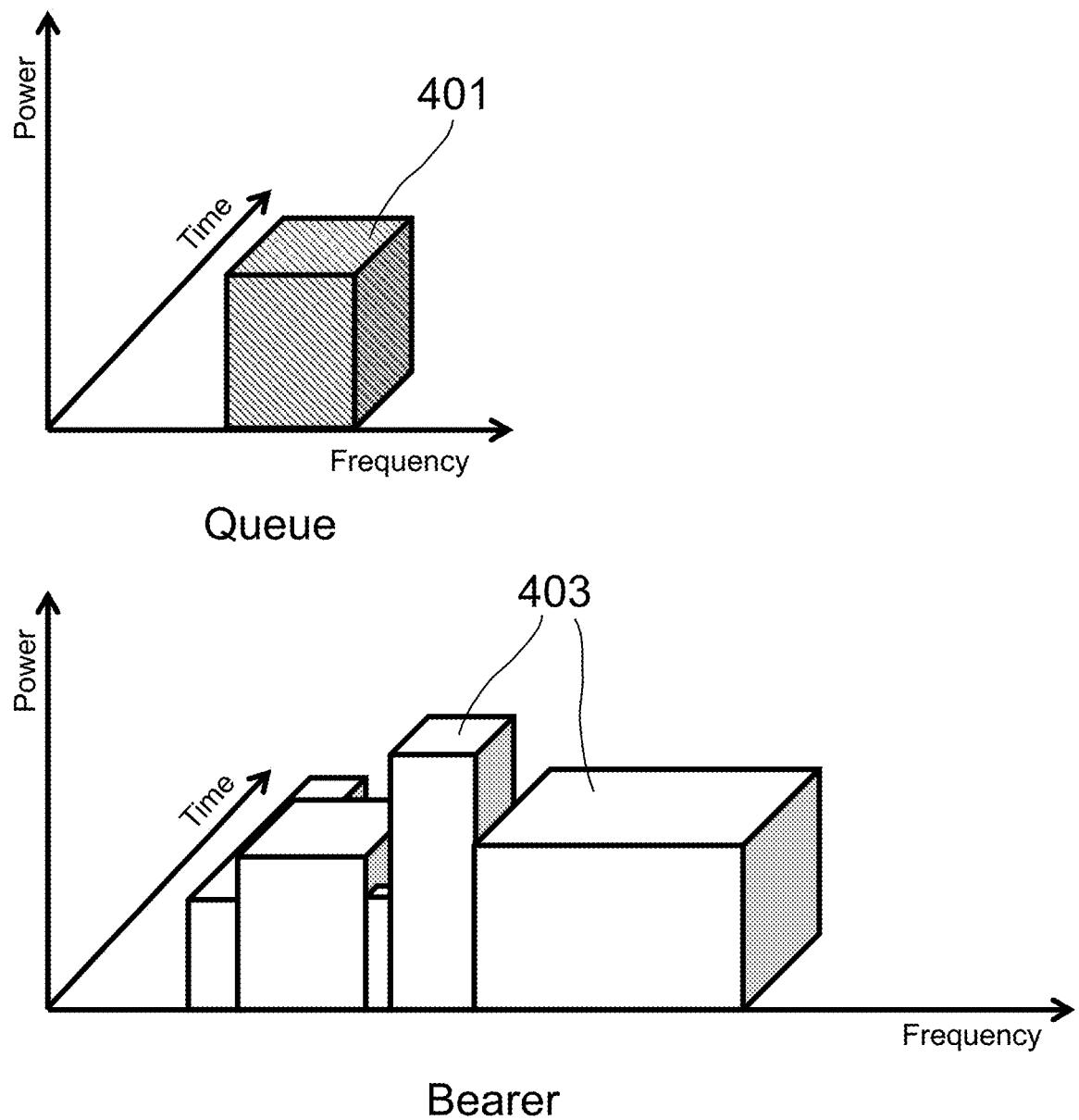
FIGS. 4a to 4e show representations of stages of a method according to embodiments of the present disclosure.

FIG. 4a shows a representation of an exemplary environment. A queue contains a single unallocated request, represented by block 401. The bearer carries a plurality of allocated communication channels, represented by blocks 403. Block 401 is currently the working channel.

Figure 4B:
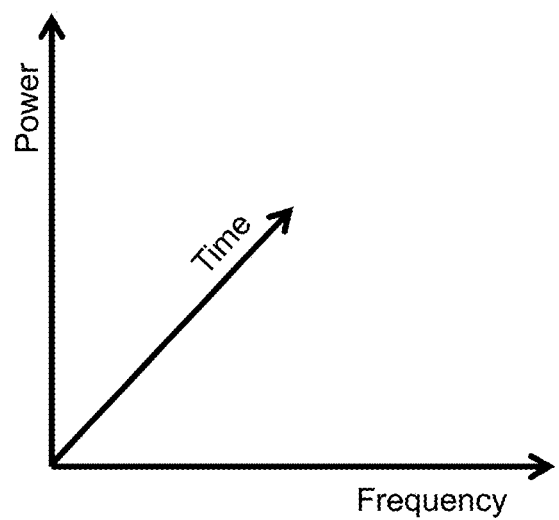
Figure 4B:
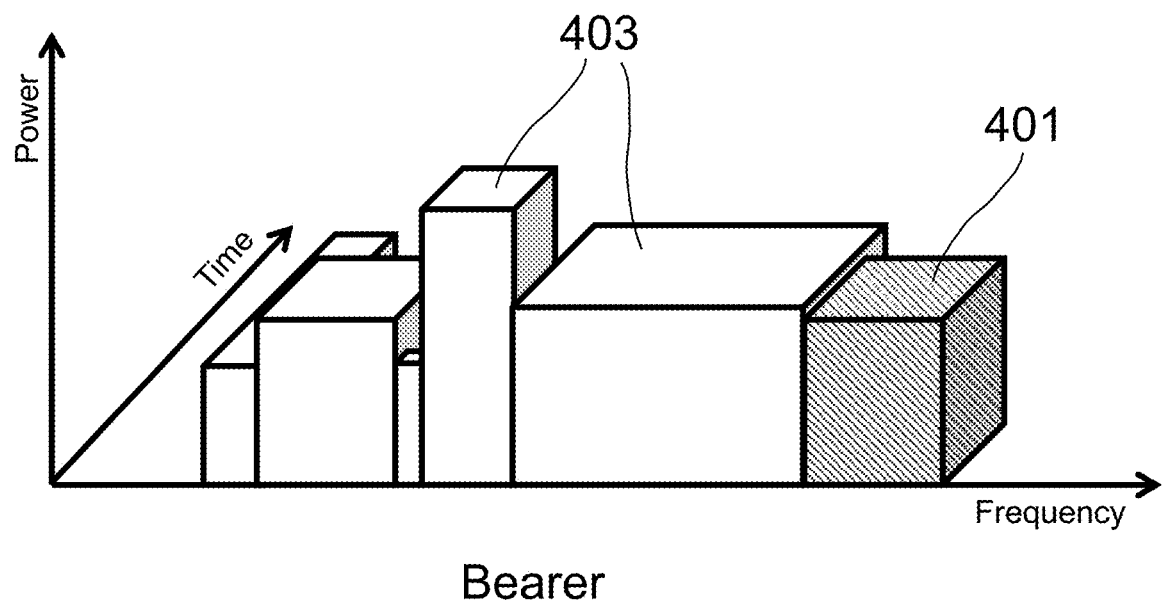

FIG. 4b shows a representation of the exemplary environment following an 'add communication channel' action by a resource management agent. Block 401 is now allocated to the bearer and, as the queue is empty, no further actions are required to manage the bearer. The allocation of block 401 is therefore committed and the satellite providing the bearer is updated to provide a new bearer configuration.

Figure 4C:
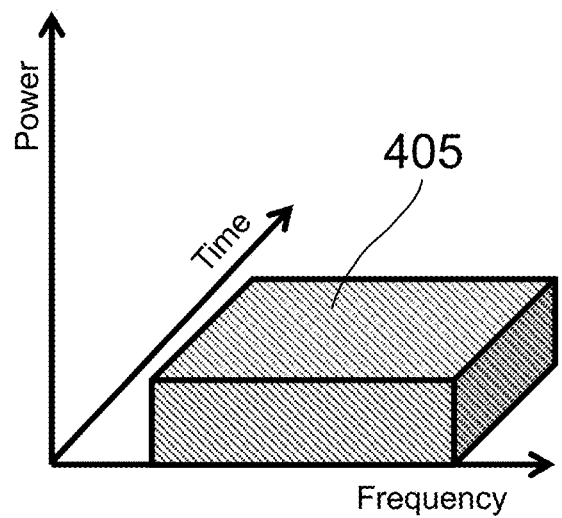
Figure 4C:
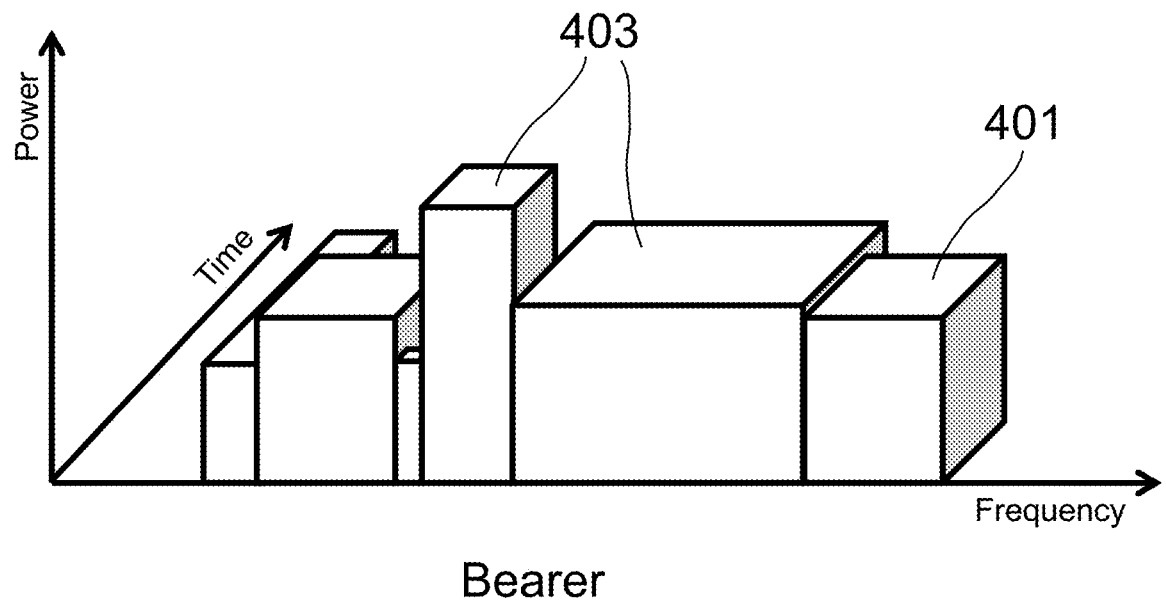

FIG. 4c shows a representation of the exemplary environment following receipt of a further request, represented by block 405. Block 405 now sits at the head of the queue and is the working channel. The bearer, as it stands, does not have the available resources to accommodate block 405, as it requires a frequency bandwidth greater than any contiguous portion of unallocated frequency spectrum on the bearer. However, if block 401 were moved, it would be possible to allocate block 405 to the bearer.

Figure 4D:
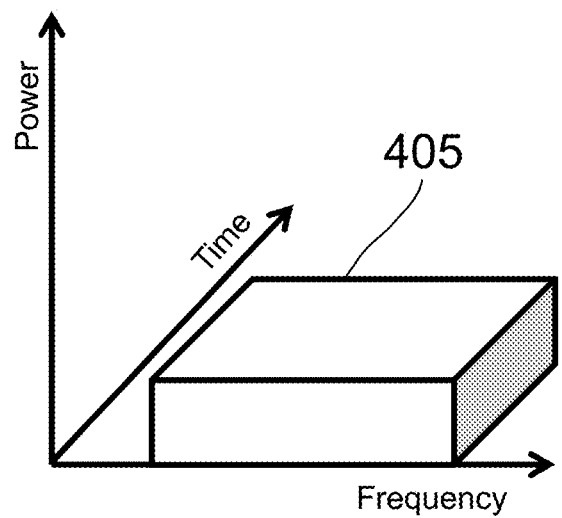
Figure 4D:
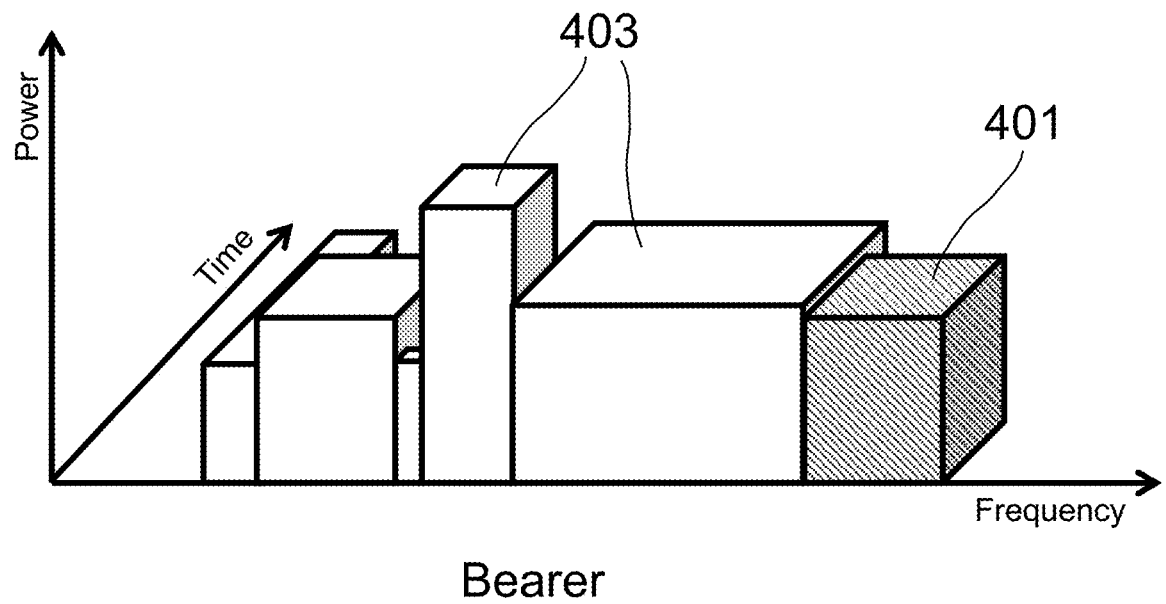

FIG. 4d shows a representation of the exemplary environment following a 'select working channel' action by the resource management agent. Block 401 is now the working channel.

Figure 4E:
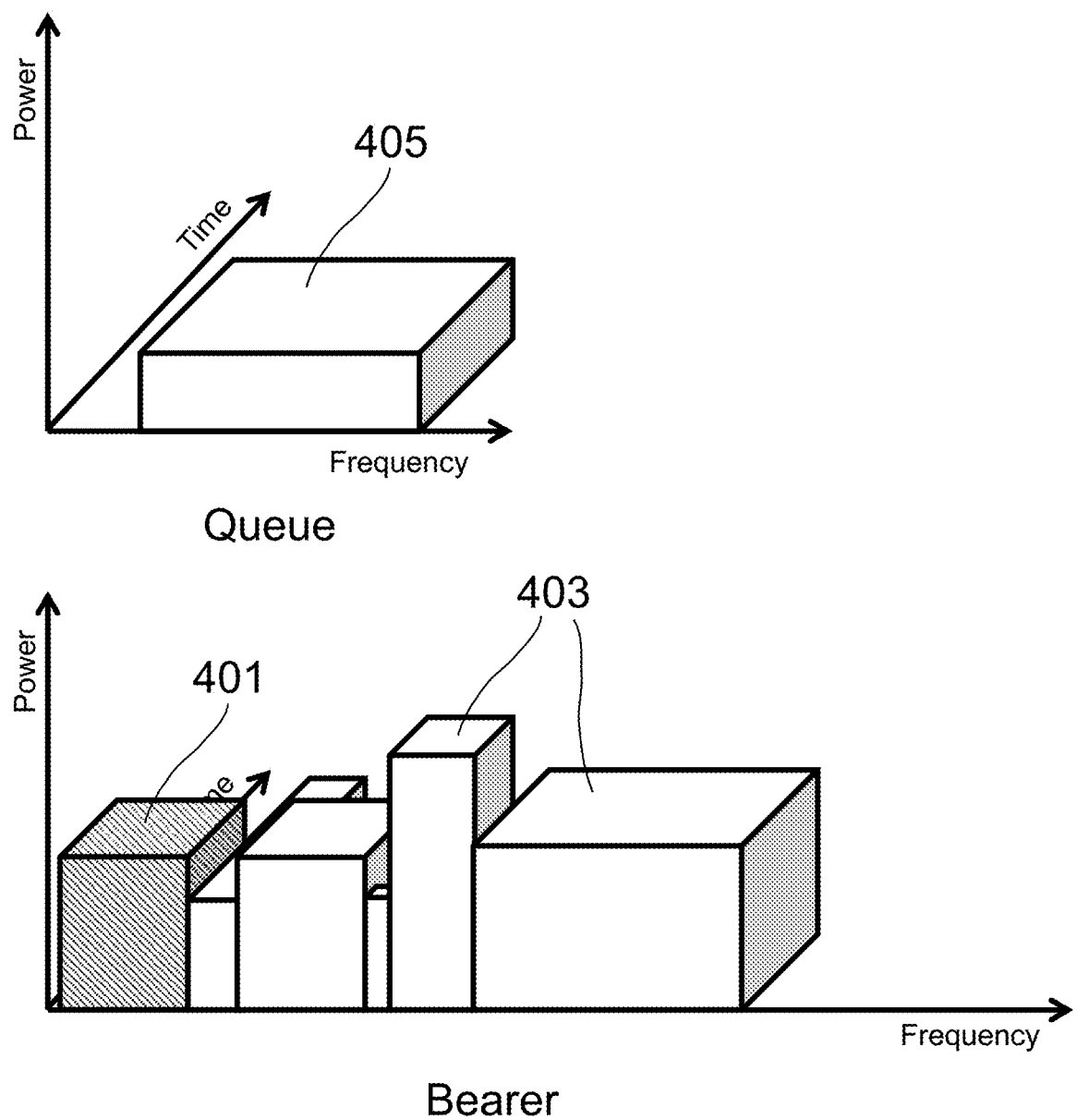

FIG. 4e shows a representation of the exemplary environment following a 'move working channel' action by the resource management agent. Block 401 has been moved to a portion of previously unallocated frequency spectrum that, while not large enough for block 405, is large enough for block 401. In doing so, the resource management agent has created a contiguous portion of unallocated frequency spectrum large enough to allow block 405 to be allocated to the bearer. Block 405 can now be selected as the working channel and added to the bearer.

According to embodiments there is provided a computer program comprising a set of instructions, which, when executed by a computerized device, cause the computerized device to perform a method of managing satellite bearer resources of a satellite telecommunications network, the method comprising:

maintaining a corpus of data based on historical satellite bearer resource allocations;

training a machine learning agent with the corpus to determine a plurality of weights for use in directing satellite bearer resource management in the satellite telecommunications network;

receiving a satellite bearer resource allocation request;

extracting a set of features from a current environment of the satellite telecommunications network, the set of features defining currently allocated satellite bearer resources; and on the basis of the determined plurality of weights and the set of features, managing satellite bearer resources of the satellite telecommunications network to satisfy the request.

While the present disclosure has been described and illustrated with reference to particular embodiments, it will be appreciated by those of ordinary skill in the art that the disclosure lends itself to many different variations not specifically illustrated herein. By way of example only, certain possible variations will now be described.

In alternative embodiments, the transponder is not located on a satellite, but is located on one of a high-altitude platform station (HAPS), unmanned aerial vehicle (UAV), or a balloon. In embodiments, the bearer comprises a wireless backhaul.

Embodiments comprise measures for managing bearer resources of a telecommunications network. A corpus of data based on historical bearer resource allocations is maintained. A machine learning agent is trained with the corpus to determine a plurality of weights for use in directing bearer resource management in the telecommunications network. A bearer resource allocation request is received. A set of features is extracted from a current environment of the telecommunications network, the set of features defining currently allocated bearer resources. On the basis of the determined plurality of weights and the set of features, bearer resources of the telecommunications network are managed to satisfy the request.

Where in the foregoing description, integers or elements are mentioned which have known, obvious or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the disclosure that are described as preferable, advantageous, convenient or the like are optional and do not limit the scope of the independent claims. Moreover, it is to be understood that such optional integers or features, while of possible benefit in some embodiments of the disclosure, may not be desirable, and may therefore be absent, in other embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method of managing satellite bearer resources of a satellite telecommunications network, the method comprising:
   maintaining a corpus of data based on historical satellite bearer resource allocations;
   training a machine learning agent with the corpus to determine a plurality of weights for use in directing satellite bearer resource management in the satellite telecommunications network;
   receiving a satellite bearer resource allocation request;
   extracting a set of features from a current environment of the satellite telecommunications network, the set of features defining currently allocated satellite bearer resources; and
   based on a determined plurality of weights and the set of features, managing satellite bearer resources of the satellite telecommunications network to satisfy the request,
   wherein the managing comprises performing at least one discrete action on one or more channels of satellite bearer resources of the satellite telecommunications network.

2. The method according to claim 1, wherein the received satellite bearer resource allocation request comprises a request to implement a given telecommunications service using satellite bearer resources of the satellite telecommunications network.

3. The method according to claim 2, wherein the request to implement comprises one or more of:
   a request for a specified frequency band and a specified transmit power, and
   one or more functional requirements of an overall communication link which the request is intended to implement.

4. The method according to claim 1, wherein the managing comprises allocation of satellite bearer resources to satisfy the request.

5. The method according to claim 1, wherein the managing comprises modifying one or more other currently allocated satellite bearer resources.

6. The method according to claim 1, wherein the at least one discrete action comprises one or more of:
   adding a channel,
   moving a channel,
   re-shaping a channel, or
   removing a channel.

7. The method according to claim 1, wherein the managing is performed further based on a further received satellite bearer resource allocation request.

8. The method according to claim 1, wherein the training comprises initializing the machine learning agent with an initial plurality of weights for use in directing satellite bearer resource management in the satellite telecommunications network.

9. The method according to claim 1, wherein the training comprises extracting a set of features from data in the corpus, the data defining a historical environment of the satellite telecommunications network, and the set of features defining historical allocated satellite bearer resources.

10. The method according to claim 1, wherein the training comprises:
    based on a predetermined reward structure, calculating a reward metric by summing values associated with one or more events which occur in directing satellite bearer resource management in the satellite telecommunications network; and
    based on the reward metric, updating the plurality of weights.

11. The method according to claim 10, wherein the reward structure comprises a channel add event with an associated channel add reward value, the channel add event comprising adding one or more new channels to satisfy the request.

12. The method according to claim 10, wherein the reward structure comprises a channel move event with an associated channel move reward value, the channel move event comprising moving one or more existing channels to satisfy the request.

13. The method according to claim 10, wherein the reward structure comprises a channel delete event with an associated channel delete reward value, the channel delete event comprising deleting one or more existing channels to satisfy the request.

14. The method according to claim 10, wherein the reward structure comprises a channel expiry event with an associated channel expiry reward value, the channel expiry event comprising an expiry of one or more existing channels after a predetermined expiry time.

15. The method according to claim 10, wherein the predetermined reward structure comprises a relatively low reward value associated with a relatively low priority channel and a relatively high reward value associated with a relatively high priority channel.

16. The method according to claim 15, wherein the predetermined reward structure comprises a medium reward value associated with a medium priority channel, the medium reward value being between the relatively low reward value and the relatively high reward value.

17. The method according to claim 1, wherein the set of features comprises one or more of:
availability of transponder power,
availability of frequency spectrum,
a priority of a channel,
a remaining lifetime or wait time of the channel, and
an indication of whether the channel is a currently selected channel.

18. A system for managing satellite bearer resources of a satellite telecommunications network, the system being configured to:
maintain a corpus of data based on historical satellite bearer resource allocations;
train a machine learning agent with the corpus to determine a plurality of weights for use in directing satellite bearer resource management in the satellite telecommunications network;
receive a satellite bearer resource allocation request;
extract a set of features from a current environment of the satellite telecommunications network, the set of features defining currently allocated satellite bearer resources; and
based on a determined plurality of weights and the set of features, manage satellite bearer resources of the satellite telecommunications network to satisfy the request by performing at least one discrete action on one or more channels of satellite bearer resources of the satellite telecommunications network.

19. A computer program stored in a non-transitory computer readable medium comprising a set of instructions, which, when executed by a computerized device, cause the computerized device to perform a method of managing satellite bearer resources of a satellite telecommunications network, the method comprising:
maintaining a corpus of data based on historical satellite bearer resource allocations;
training a machine learning agent with the corpus to determine a plurality of weights for use in directing satellite bearer resource management in the satellite telecommunications network;
receiving a satellite bearer resource allocation request;
extracting a set of features from a current environment of the satellite telecommunications network, the set of features defining currently allocated satellite bearer resources; and
based on the determined plurality of weights and the set of features, managing satellite bearer resources of the satellite telecommunications network to satisfy the request,
wherein the managing comprises performing at least one discrete action on one or more channels of satellite bearer resources of the satellite telecommunications network.

* * * * *